(12) United States Patent
Contreras

(10) Patent No.: US 10,791,712 B2
(45) Date of Patent: Oct. 6, 2020

(54) PET NAIL CLIPPER

(71) Applicant: Alexandre Contreras, Homestead, FL (US)

(72) Inventor: Alexandre Contreras, Homestead, FL (US)

(73) Assignee: Alexandre Contreras, Homestead, FL (US)

( * ) Notice: Subject to any disclaimer, the term of this patent is extended or adjusted under 35 U.S.C. 154(b) by 102 days.

(21) Appl. No.: 15/443,131

(22) Filed: Feb. 27, 2017

(65) Prior Publication Data

US 2017/0245469 A1 Aug. 31, 2017

Related U.S. Application Data

(60) Provisional application No. 62/301,056, filed on Feb. 29, 2016.

(51) Int. Cl.
| | | |
|---|---|---|
| *A01K 17/00* | (2006.01) | |
| *A45D 29/02* | (2006.01) | |
| *A45D 29/04* | (2006.01) | |
| *A01K 13/00* | (2006.01) | |

(52) U.S. Cl.
CPC ............ *A01K 17/00* (2013.01); *A01K 13/003* (2013.01); *A45D 29/02* (2013.01); *A45D 29/04* (2013.01)

(58) Field of Classification Search
CPC ...... A45D 29/02; A45D 34/045; A45D 29/04; A45D 29/18; B26B 13/22; B26B 17/02; B26B 13/00; B26B 13/16; A01K 17/00; A01K 13/003

USPC ............ 7/158, 162; 119/602, 633; 220/229; D30/158; 30/175–179, 186–193, 231, 30/125, 131, 26–29; D8/52, 55, 58, 5
See application file for complete search history.

(56) References Cited

U.S. PATENT DOCUMENTS

| | | | | |
|---|---|---|---|---|
| 810,402 | A * | 1/1906 | Friese | A45D 29/02 132/75.5 |
| 1,276,433 | A * | 8/1918 | Stainbrook | B25B 7/22 30/125 |
| 2,436,291 | A * | 2/1948 | Lewis | B65D 51/24 15/257.05 |
| 3,189,996 | A * | 6/1965 | Casey, Jr. | A45D 29/02 30/28 |
| 3,838,507 | A | 10/1974 | Clark | |
| 3,943,947 | A * | 3/1976 | Voll | A45D 29/02 132/73 |

(Continued)

FOREIGN PATENT DOCUMENTS

DE 29502362 U1 * 3/1995 ............ A45D 29/02

*Primary Examiner* — Jason Daniel Prone
*Assistant Examiner* — Samuel A Davies
(74) *Attorney, Agent, or Firm* — Hackler Daghighian Martino & Novak

(57) ABSTRACT

A pet nail clipper is provided. The pet nail clipper includes an upper arm and a lower arm. The upper arm includes a handle portion and a cutting portion having a blade. The lower arm also includes a handle portion and a cutting portion having a blade. A pivot bolt pivotally connects the upper arm and the lower arm together in between the handle portions and the cutting portions. A spring is attached to the upper arm and the lower arm. The spring biases the handle portions away from one another and biases the cutting portions away from one another. A deburring plate and a styptic receptacle are secured to the handle portions of the arms.

17 Claims, 4 Drawing Sheets

(56) References Cited

U.S. PATENT DOCUMENTS

| | | |
|---|---|---|
| 4,228,585 A | 10/1980 | Nelson |
| 4,747,842 A | 5/1988 | Dietz |
| 4,788,768 A * | 12/1988 | Ohori .................... A45D 29/02 |
| | | 132/73.5 |
| 5,762,027 A | 6/1998 | Freund |
| 6,827,038 B2 | 12/2004 | Dunn et al. |
| 7,137,356 B2 | 11/2006 | Huggans |
| 7,217,001 B2 | 5/2007 | Vrsalovic et al. |
| 7,464,665 B1 | 12/2008 | Rogers et al. |
| 7,530,131 B1 * | 5/2009 | Conrique ................ B25F 1/04 |
| | | 7/158 |
| 7,621,011 B2 | 11/2009 | Smith et al. |
| D615,254 S | 5/2010 | Manheimer, III et al. |
| 7,874,269 B2 | 1/2011 | Dunn et al. |
| 8,100,088 B2 | 1/2012 | Manheimer, III et al. |
| 8,156,900 B1 | 4/2012 | Gaunt |
| 8,469,039 B2 | 6/2013 | Jackson |
| 8,658,193 B2 | 2/2014 | Greenwald |
| 2002/0166238 A1 * | 11/2002 | Kaufer .................... B26B 13/22 |
| | | 30/125 |
| 2003/0159292 A1 * | 8/2003 | Wu .......................... A01G 3/02 |
| | | 30/123.3 |
| 2004/0163607 A1 * | 8/2004 | Dunn .................... A01K 13/00 |
| | | 119/602 |
| 2005/0204563 A1 * | 9/2005 | Stender .................... B25F 5/00 |
| | | 30/123 |
| 2005/0211030 A1 * | 9/2005 | Moulton, III .......... A45D 29/02 |
| | | 83/13 |
| 2005/0229862 A1 | 10/2005 | Dirle et al. |
| 2006/0158871 A1 * | 7/2006 | Hopkins ................ A01K 13/00 |
| | | 362/119 |
| 2006/0268540 A1 * | 11/2006 | Vrsalovic .............. A01K 13/00 |
| | | 362/119 |
| 2007/0017539 A1 * | 1/2007 | Hurwitz ................ A01K 13/002 |
| | | 132/114 |
| 2007/0137041 A1 | 6/2007 | Manheimer et al. |
| 2009/0252840 A1 * | 10/2009 | Thorn .................... A23K 50/20 |
| | | 426/138 |
| 2018/0064066 A1 * | 3/2018 | Lou ...................... A01K 13/003 |

\* cited by examiner

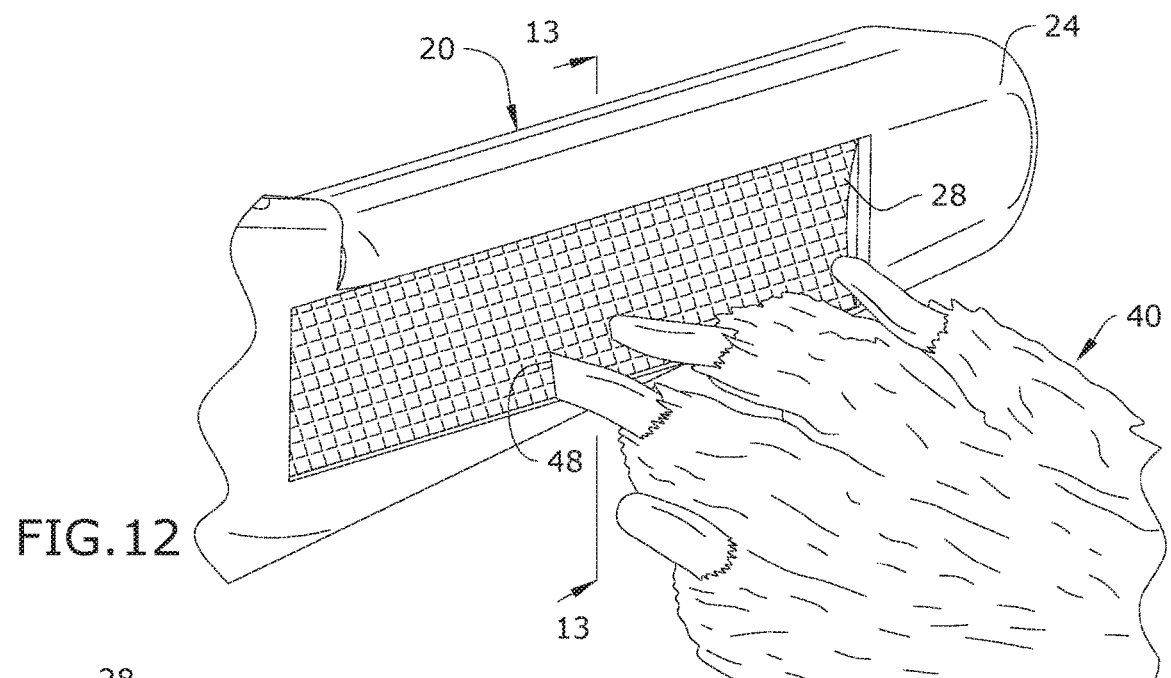
FIG.12
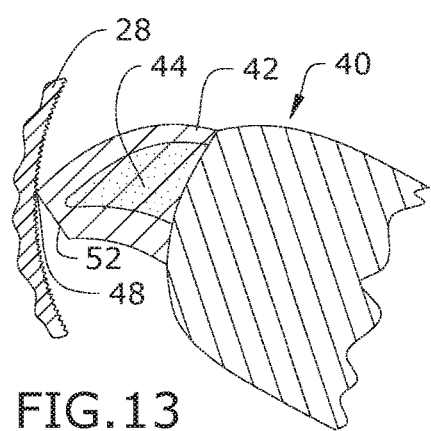
FIG.13
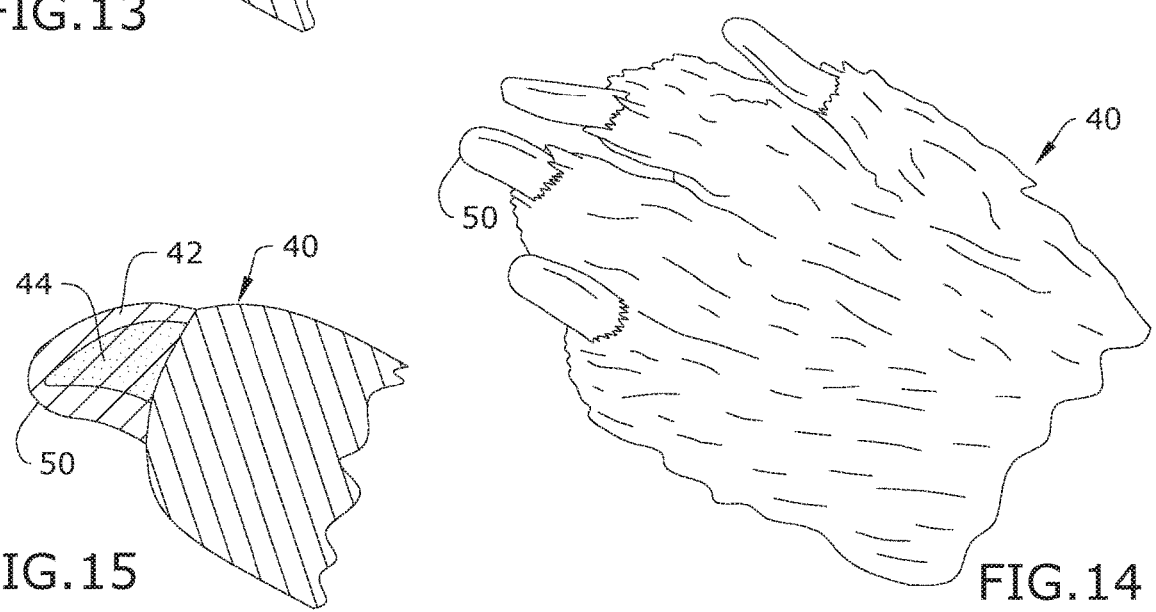
FIG.15
FIG.14

PET NAIL CLIPPER

CROSS-REFERENCE TO RELATED APPLICATION

This application claims the benefit of priority of U.S. provisional application No. 62/301,056 filed Feb. 29, 2016, the contents of which are herein incorporated by reference.

BACKGROUND OF THE INVENTION

The present invention relates to a pet nail clipper and, more particularly, to a pet nail clipper with a deburring plate and a styptic receptacle.

Pets have either nails or claws that enable them to climb, defend themselves and catch prey. Since most pets, such as dogs, cats, birds, and other small critters do not use nails or claws like they do in the wild, their nails or claws continue to grow. A groomer or owner of the pet must regularly inspect and trim the nails or claws. Overgrown nails can cause damage to the skin and personal belongings of the pet owner. Also, long nails can curl around if left unattended and lead to a painful embedded Therefore, nails need to be cut and filed. If the nail begins to bleed, the nail may be submerged in a styptic material.

As can be seen, there is a need for a pet nail clipper that clips nails, files nails and readily provides a styptic material.

SUMMARY OF THE INVENTION

In one aspect of the present invention, a pet nail clipper comprises: an upper arm comprising a handle portion and a cutting portion comprising a blade; a lower arm comprising a handle portion and a cutting portion comprising a blade; a pivot bolt pivotally attaching the upper arm and the lower arm together in between the handle portions and the cutting portions; a receptacle bracket laterally extending from at least one of the upper arm and the lower arm; and a receptacle secured within the receptacle bracket.

In another aspect of the present invention, a pet nail clipper comprises: an upper arm comprising a handle portion and a cutting portion comprising a blade; a lower arm comprising a handle portion and a cutting portion comprising a blade; a pivot bolt pivotally attaching the upper arm and the lower arm together in between the handle portions and the cutting portions; and a deburring plate secured to at least one of the upper arm and the lower arm.

These and other features, aspects and advantages of the present invention will become better understood with reference to the following drawings, description and claims.

BRIEF DESCRIPTION OF THE DRAWINGS

FIG. 12 is a perspective detail view of an embodiment of the present invention shown in use;

FIG. 13 is a section view of the present invention taken along line 13-13 in FIG. 12;

FIG. 14 is a perspective view of a paw and nails after using the present invention; and FIG. 15 is a section detail view of a paw and nail after using the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention provides for a convenient way of clipping a dog, cat or any small animal's nails, filing the nails and stopping the nail from hemorrhaging if needed. The present invention may include a first handle with an integrated stainless steel file used to shave down the nail. The present invention may further include stainless steel blades used to cut nails. A second handle may include a loop that retains a disposable styptic powder cartridge. A bolt and screw may pivotally connect both handles and blades together. A spring biases the handles and blades apart. A disposable styptic powder cartridge is secured within the loop. A locking latch may be used to close clippers when not in use. A thin rubber silicone cap may be secured to the cartridge. A thin foil may be disposed under the rubber silicone cap.

To use the invention, grab the clippers with one hand on the gripping portions of the handles. By squeezing the handles together, the stainless-steel blades cut the nails. Once the nails are cut, use the integrated stainless steel file to trim down burrs left behind from cutting the nails. The spring allows the blades to reset to be used again. If the nail happens to hemorrhage, use the disposable styptic cartridge to stop the bleeding. Penetrate the rubber silicone cap with the nail to get passed the thin foil and into the cup that holds the styptic powder. Allow the nail to sit in powder for a few minutes to stop the bleeding.

Figure 1:
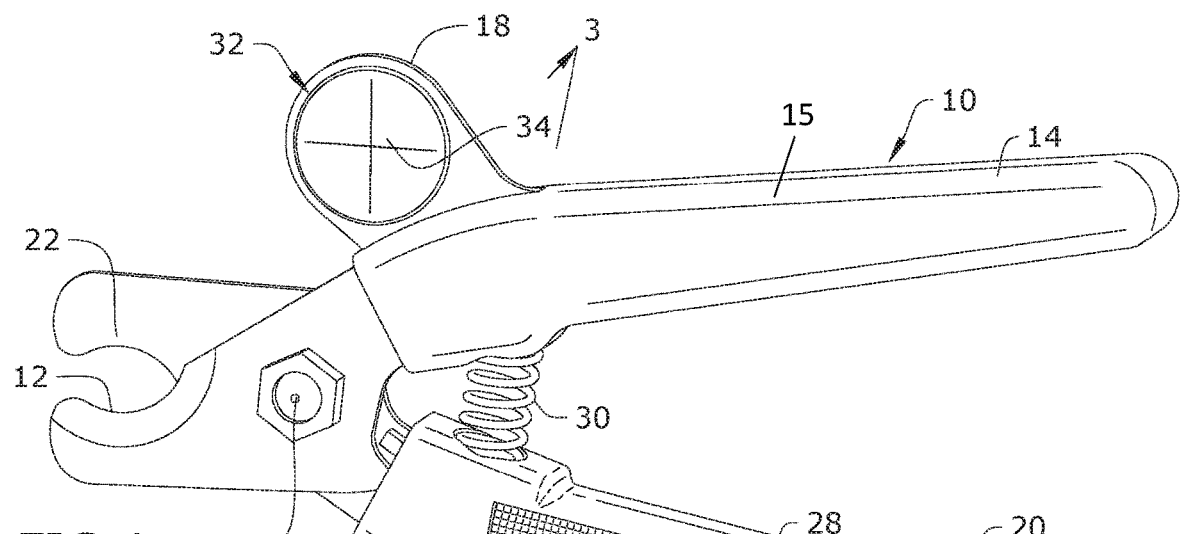
FIG. 1 is a perspective view of an embodiment of the present invention shown in an expanded configuration.
Figure 2:
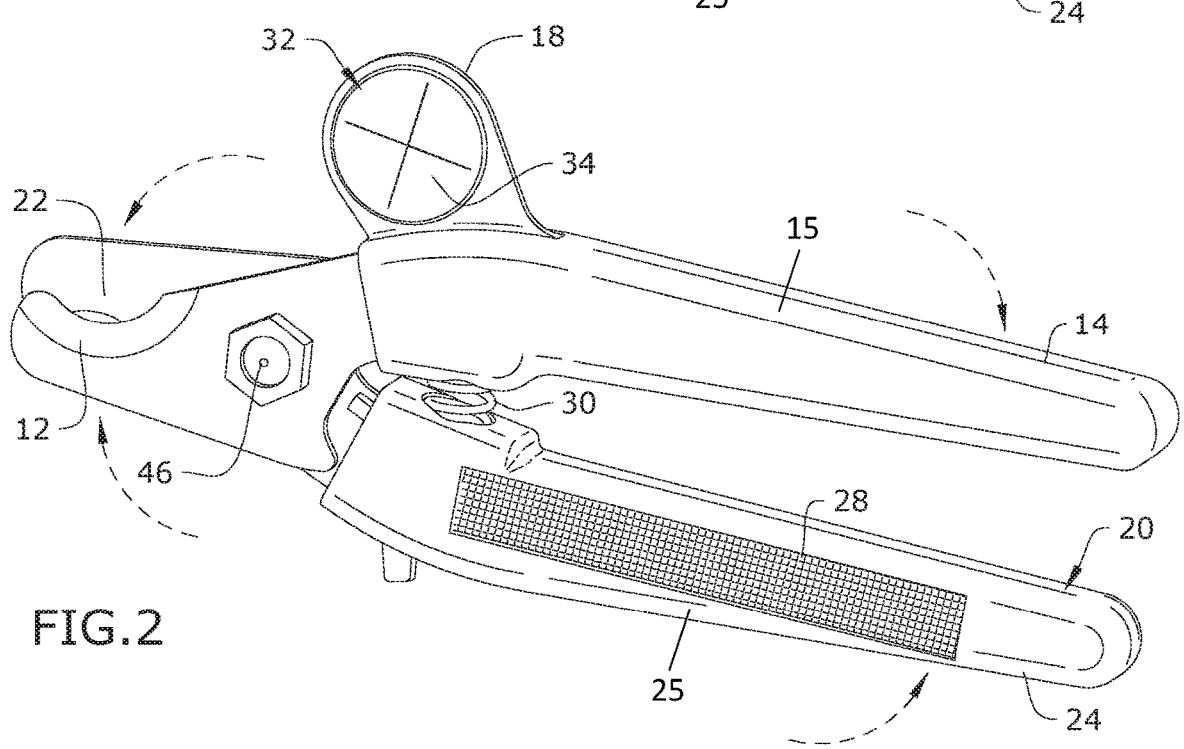
FIG. 2 is a perspective view of an embodiment of the present invention shown in a contracted configuration.
Figure 3:
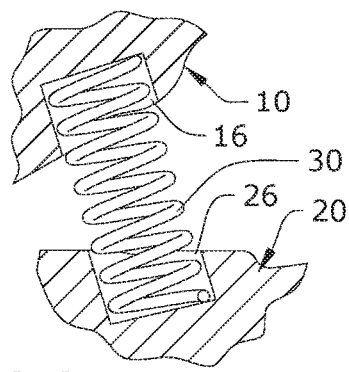
FIG. 3 is a section detail view of the present invention taken along line 3-3 in FIG. 1.
Figure 5:
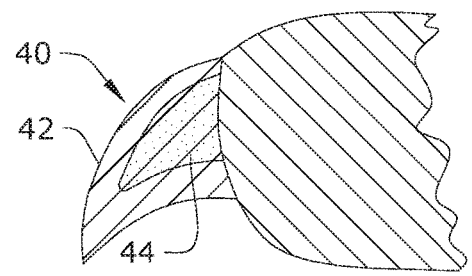
FIG. 5 is a section view of an uncut nail.
Figure 4:
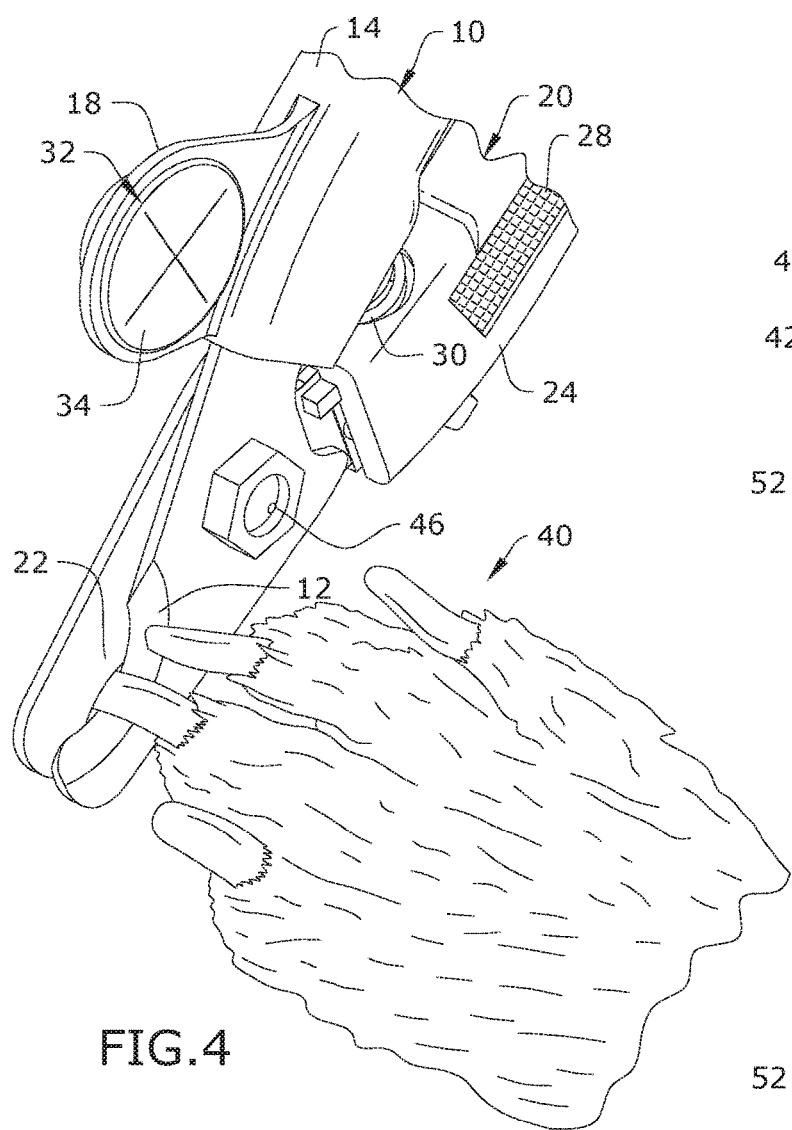
FIG. 4 is a perspective view of an embodiment of the present invention shown in use.
Figure 6:
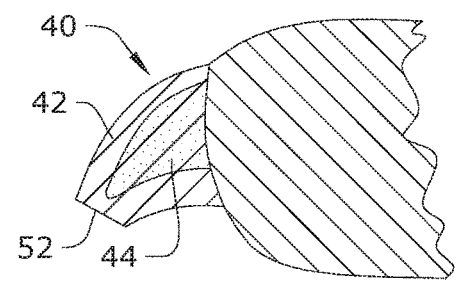
FIG. 6 is a section view of a cut nail.
Figure 7:
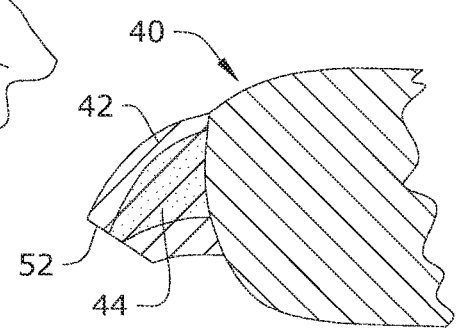
FIG. 7 is a section view of a cut quick.
Figure 8:
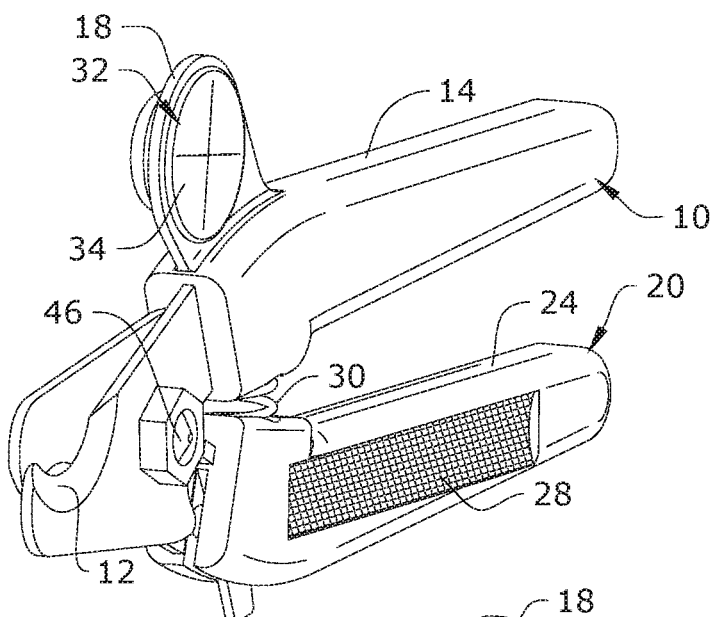
FIG. 8 is a perspective view of an embodiment of the present invention.
Figure 9:
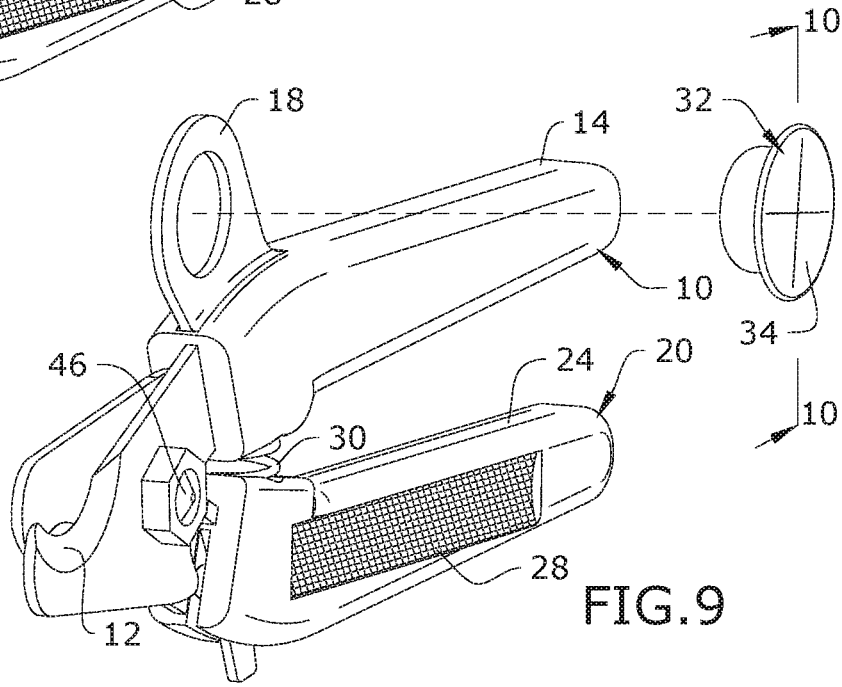
FIG. 9 is an exploded view of an embodiment of the present invention.
Figure 10:
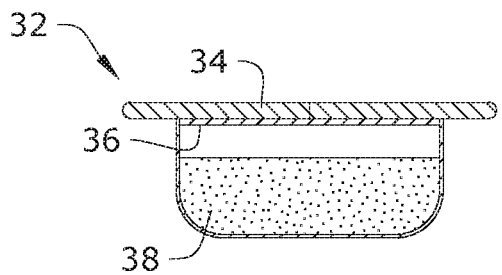
FIG. 10 is a section detail view of the present invention taken along line 10-10 in FIG. 9.
Figure 11:
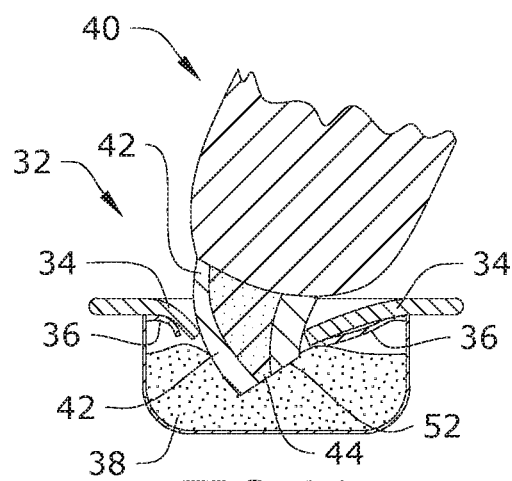
FIG. 11 is a section detail view of an embodiment of the present invention shown in use.

Referring to FIGS. 1 through 15, the present invention includes a pet nail clipper. The pet nail clipper includes an upper arm 10 and a lower arm 20. The upper arm 10 includes a handle portion 14 and a cutting portion 12 having a blade. The lower arm 20 also includes a handle portion 24 and a cutting portion 22 having a blade. Each handle portion 14 and 24 includes a gripping portion 15 and 25 respectively. A pivot bolt 46 pivotally connects the upper arm 10 and the lower arm 20 together in between the handle portions 14, 24 and the cutting portions 12, 22. A spring 30 is attached to the upper arm 10 and the lower arm 20. The spring 30 may fit within an upper cavity 16 formed on an underside of the upper arm 10 and a lower cavity 26 formed on an underside of the lower arm 20. The spring 30 biases the handle portions 14, 24 away from one another and biases the cutting portions 12, 22 away from one another. A user may place the cutting portions 12, 22 over a tip of the nail 40, squeeze the handle portions 14, 24 together, and cut the nail 40 to form a flat surface 52.

The pet nail clippers may further retain a receptacle 32. The receptacle 32 may house styptic liquid or powder 38. In such embodiments, a receptacle bracket 18 extends laterally from at least one of the upper arm 10 and the lower arm 20. For example, the receptacle bracket 18 may extend laterally from the handle portion 14 of the upper arm 10 forward of the gripping portion 15. The receptacle bracket 18 may include a plate with a looped inner edge forming an opening. The receptacle 32 may include a rounded sidewall that fits within and releasably retains to the receptacle bracket 18. In certain embodiments, a lid 34 may be secured to an upper edge of the sidewall of the receptacle 32. The lid 34 may be made of a material having a rubber elasticity, such as silicone, rubber and the like. At least one slit, such as crisscrossing slits, may be formed through the lid 34. A seal 36 may cover the receptacle underneath the lid prior to use. If a quick 44 is cut, the groomer may easily place the nail casing 42 of the nail 40 through the slits and into the styptic liquid or powder 38, which stops the bleeding.

In certain embodiments, the present invention further includes a deburring plate 28. The deburring plate 28 is secured to at least one of the upper arm 10 and the lower arm 20. For example, the deburring plate 28 may be secured to the handle portion 24 of the lower arm 20. The deburring plate 28 may include a metal plate having an inner surface secured to the handle portion 24 and an outer abrasive or course surface. After the nail 40 has been clipped, the groomer may grind an edge 48 of the outer casing 42 of the nail 40 to further smoothen and round the nail 50.

It should be understood, of course, that the foregoing relates to exemplary embodiments of the invention and that modifications may be made without departing from the spirit and scope of the invention as set forth in the following claims.

What is claimed is:

1. A pet nail clipper comprising:
   a first arm comprising a first handle portion and a first cutting portion comprising a first blade;
   a second arm comprising a second handle portion and a second cutting portion comprising a second blade, wherein the second handle portion includes a gripping portion and has a receptacle bracket that extends laterally out from the second handle portion forward of the gripping portion;
   a pivot bolt pivotally attaching the first arm and the second arm together in between the first and second handle portions and the first and second cutting portions; and
   a receptacle secured within the receptacle bracket wherein the receptacle has an entrance designed to receive a pet's nail into a styptic substance contained within the receptacle.

2. The pet nail clipper of claim 1, further comprising a lid secured to an upper edge of the receptacle, wherein the lid comprises a rubber elasticity and at least one slit forming the entrance into the receptacle.

3. The pet nail clipper of claim 1, wherein the receptacle bracket is a plate comprising an inner edge forming an opening, wherein the receptacle is releasably secured within the inner edge.

4. The pet nail clipper of claim 1, further comprising a deburring plate secured to at least one of the first arm and the second arm.

5. The pet nail clipper of claim 4, wherein the deburring plate comprises a metal plate comprising an abrasive outer surface.

6. The pet nail clipper of claim 5, wherein the deburring plate is secured to the first handle portion of the first arm.

7. The pet nail clipper of claim 1, further comprising a spring attached to the first arm and the second arm and biasing the first handle portion away from the second handle portion and the first cutting portion away from the second cutting portion.

8. The pet nail clipper of claim 1, further comprising a styptic liquid or powder contained within the receptacle.

9. A pet nail clipper comprising:
   a first arm comprising a first handle portion and a first cutting portion comprising a first blade;
   a second arm comprising a second handle portion and a second cutting portion comprising a second blade, wherein the second handle portion includes a gripping portion and has a receptacle bracket that extends laterally out from the second handle portion forward of the gripping portion;
   a pivot point that pivotally couples the first arm and the second arm together in between the handle portions and the cutting portions;
   a receptacle secured within the receptacle bracket wherein the receptacle has an entrance designed to receive a pet's nail into a styptic substance contained within the receptacle; and
   a styptic liquid or powder contained within the receptacle.

10. The pet nail clipper of claim 9, further comprising a lid secured to an upper edge of the receptacle, wherein the lid comprises a rubber elasticity and has the entrance into the receptacle.

11. The pet nail clipper of claim 10, wherein the entrance is a slit.

12. The pet nail clipper of claim 9, further comprising a deburring plate secured to at least one of the first arm and the second arm.

13. The pet nail clipper of claim 12, wherein the deburring plate comprises a metal plate comprising an abrasive outer surface.

14. A pet nail clipper comprising:
    a first arm comprising a first handle portion and a first cutting portion comprising a first blade;
    a second arm comprising a second handle portion and a second cutting portion comprising a second blade, wherein the second handle portion includes a gripping portion and has a receptacle bracket that extends laterally out from the second handle portion forward of the gripping portion;
    a pivot point that pivotally couples the first arm and the second arm together in between the handle portions and the cutting portions;
    a receptacle secured within the receptacle bracket wherein the receptacle comprises a surface with a rubber elasticity and at least one entrance into the receptacle; and
    a styptic liquid or powder contained within the receptacle.

15. The pet nail clipper of claim 14, wherein the entrance is a slit.

16. The pet nail clipper of claim 14, wherein the receptacle bracket is a plate comprising an opening with an inner edge and wherein the receptacle is releasably secured within the inner edge.

17. The pet nail clipper of claim 14, wherein the receptacle bracket has a circular hole with an axis that is parallel to a pivot axis of the pivot point.

* * * * *